Patented Nov. 11, 1947

2,430,481

UNITED STATES PATENT OFFICE 2,430,481

MANUFACTURE OF PLASTIFIED RUBBER AND ADHESIVE LATEX

Charles Saint-Mleux, Carcassonne, France, assignor to Societe Meridionale du Caoutchouc Someca, Société à Responsabilité Limitée, Carcassonne, France, a company of France No Drawing. Application August 29, 1945, Serial No. 613,452. In France September 25, 1942

4 Claims. (Cl. 260—761)

It has been endeavoured to produce adhesive latex by adding to latex one or more chemicals of various kinds such as resins, fecula, starch, phenylhydrazine, toluene, various oxidizing agents, etc., as aqueous solutions, emulsions or suspensions.

The results have never been satisfactory at least for certain industrial applications and particularly for industry of shoes, for the following reasons:

1. The adhesivity of the latex dry film is not substantially improved, as a suspension agent which largely interferes with sticking power is often required in connection with adhesive substances.

2. Where a large proportion of adhesive substances is used, there is obtained a tacky film which leads to mock adhesion and is devoid of inner fastness (coherence). With a shoe sole stuck in this way, foot warming when walking suffices to unstick the sole.

3. Should latex so rendered adhesive be admixed with proper ingredients to produce self-vulcanization of the dry film, the latter altogether looses its sticking power.

4. If an oxidizing substance such as little concentrated hydrogen peroxide is added, an unsufficiently adhesive glue is obtained.

On the other hand, it is well known that rubber manufacturers have always wished to receive starting material from plantations as dry rubber sheets having a predetermined degree of plasticity to comply with the requirements in the manufacture of goods from said starting material. As to starting material delivered as latex, it more often than not leads to too nervous products which must be depolymerized by mastication on roll mills.

It is an object of this invention to provide a method whereby the very rubber globules are rendered adhesive without resorting to any plasticizer or any solvent.

A further object is to do away with mechanical mastication on cold or hot cylinders, in producing plasticized rubber.

A further object is to produce rubber having a predetermined plasticity with utmost accuracy.

A still further object is to depolymerize rubber without substantial resinification thereof.

Still further objects will become apparent as the specification proceeds.

Broadly considered, my invention comprises reacting concentrated hydrogen peroxide with latex under such conditions as to obtain the required degree of plasticity, or adhesivity.

When referring to concentrated hydrogen peroxide, I mean an hydrogen peroxide solution which is capable of evolving from about 20 to 250 volumes of oxygen, i. e. an aqueous solution containing from about 6 to 75 per cent by weight of pure peroxide.

More particularly, my invention comprises adding to latex a weight of hydrogen peroxide which is substantially the same as the weight of dry gum in said latex; it also comprises the feature of reacting hydrogen peroxide with latex in a plurality of reaction steps instead of one.

Although this should not be construed in a limitative sense, I have found that the readily available commercial hydrogen peroxide capable of evolving 110 volumes of oxygen is especially valuable as it is particularly efficient for depolymerizing purposes.

I may, for instance, start from natural latex to which any preservative agent (such as casein) has been added as usual to prevent coagulation, and I incorporate therein by successive additions a weight of hydrogen peroxide (110 volumes) which is substantially equal to the weight of dry gum in latex; ammonia may be added to latex beforehand. Thus, for instance, taking 1 litre of 60 per cent concentrated latex, i. e. latex containing 600 g. of dry gum per litre, I add thereto in a plurality of steps 600 g. of hydrogen peroxide (110 volumes).

The following table will show the advantage of selecting hydrogen peroxide capable of evolving 110 volumes of oxygen and adding it in a plurality of steps

| Manner of operation (temperature 30° C.) | 60 per cent creamed latex, dried in hot air (50° C.), without addition of $H_2O_2$ | One addition of $H_2O_2$ (20 volumes) to latex (100 per cent of the weight of dry gum) | One addition of $H_2O_2$ (110 volumes) to latex (100 per cent of the weight of dry gum) | Four additions of $H_2O_2$ (20 volumes) to latex (100 per cent of the weight of dry gum) | Four additions of $H_2O_2$ (110 volumes) to latex (100 per cent of the weight of dry gum) |
|---|---|---|---|---|---|
| Fluidity (in Barbey degrees) of a solution of 1 g. of dry gum in 100 cc. of crystallizable benzine. | 290° Natural latex. | 350° | 500° Latex A | 700° | 1800° Latex B. |

The above numbers expressing fluidity in terms of Barbey degrees may be converted to numbers expressing viscosity in terms of Engler degrees by means of the following formula $$F = \frac{662}{E - \frac{0.864}{E}}$$

wherein F stands for the number of Barbey degrees and E for the number of Engler degrees.

The fluidity expressed by 1800° Barbey exactly corresponds to the plasticity of a dry gum obtained after masticating said gum on heated rollers of a mixer, with a view to producing a benzine solution held as having the best qualities of adhesivity.

It should be remarked that in most cases where a rubber glue or cement is used, gum dissolved in benzine has been preferred to latex as shipped from plantations because adhesive power of dry rubber can be improved by mastication on rollers, while this is not practicable with latex.

I have found that it is generally useless to proceed further with H₂O₂ additions as dry gum becomes more and more plastic to the prejudice of its rubber properties, as will be exemplified by the following table:

| Manner of operation (temperature 30° C.) | Addition to latex B of 33 per cent of H₂O₂ (110 volumes), as reckoned on dry gum | Addition to latex C of 40 per cent of H₂O₂ (110 volumes), as reckoned on dry gum | Addition to latex D of 45 per cent of H₂O₂ (110 volumes), as reckoned on dry gum | Crystallizable benzine |
|---|---|---|---|---|
| Fluidity (in degrees Barbey) at 56° C. of a solution of 1 g. of dry gum in 100 cc. of crystallizable benzine. | 3140° Latex C | 3580° Latex D | 3700° | 4200°. |

It is necessary to work at a predetermined temperature, otherwise plasticity is altered by temperature and increases therewith. Hence, temperature should be selected to comply with the degree of plasticity to be reached at the end of the operation.

Where latex is obtained, i. e. in plantations, the average minimum temperature is always fairly high, so that the treatment may be effected at ambient temperature, without any additional heating.

The following table will show how the fluidity of gum, i. e. its plasticity, vary as a function of temperature:

| Temperature, degrees C | 20 | 30 | 40 | 50 | 60 |
|---|---|---|---|---|---|
| Fluidity (degrees Barbey) of 1 g. of dry gum in 100 cc. of crystallizable benzine (1 g. of dry gum extracted from natural latex treated by H₂O₂ as hereinbefore explained, at temperature given in the table) degrees | 1,300 | 1,800 | 2,250 | 2,450 | 2,500 |

When plastification with H₂O₂ is effected at 60° C., a considerable evaporation takes place; an amount of coagulation may happen above said temperature.

My method may be carried out in sheet-metal vats having any dimensions and shape, preferably vats made of enamelled sheet metal. While hydrogen peroxide is being poured into latex, the mass is stirred, then allowed to settle.

Plastified latex in form of a suspension (at 1800° Barbey for instance) may be either concentrated, given an addition of ammonia and shipped in casks, or coagulated, washed and dried into sheets according to usual plantation practice. Thus with my process, a hevea grower may deliver dry gum sheets having a predetermined plasticity.

When it is desired to obtain dry gum sheets with various degrees of plasticity, it is not necessary to vary the manufacture conditions (temperature, amount of hydrogen peroxide and so on) it is more convenient to proceed as follows:

Assuming that latex plastified to 1800° Barbey is usually manufactured and a less plastified latex should be produced, it is preferable to admix latex already plastified to 1800° Barbey with a predetermined amount of untreated natural latex.

The following table will show that it is possible accurately to obtain the full range of required plasticities

| Percentage of dry latex plastified to 1800° Barbey in the total amount of dry gum | 0 | 10 | 20 | 30 | 40 | 50 | 60 | 70 | 80 | 90 | 100 |
|---|---|---|---|---|---|---|---|---|---|---|---|
| Fluidity (degrees Barbey) at 56° C. of a solution of 1 g. of dry rubber in 100 cc. of crystallizable benzine degrees | 290 natural latex | 400 | 520 | 620 | 720 | 850 | 1,050 | 1,280 | 1,420 | 1,620 | 1,800 |

The plasticity of the various mixes after coagulation, washing and drying may be measured with any type of plastometer.

Previous plastification of rubber is of interest since rubber manufacturers have been requesting to receive gums suitably brought to a degree of plasticity complying as far as possible with the requirements for every type of mix. Now, I believe that my chemical method of plastifying gum serves the purpose insofar as the objects set forth in the opening part of this specification are attained.

I have found that my chemical method of plastification results in depolymerizing rubber exactly as it is done mechanically with a roller mixer. Chemically plastified gum may be vulcanized as usual, and the vulcanization product has an excellent behaviour in natural or accelerated ageing.

The employment of anti-oxidants as now in use is particularly advisable with a gum treated in accordance with this invention.

An acetone extract of my gum plastified to 1800° Barbey is equivalent to one produced from the same original but untreated gum. Hence no abnormal resinification of rubber takes place, and it is likely that oxygen plays only a catalytic part.

As my gum has a smaller modulus of elasticity than untreated gum, it allows of producing without any addition of plasticizers, softer or more flexible articles than usually manufactured from the same original latex. It may be used alone or in combination, whatever the proportion may be, with untreated latex, for the manufacture of dipped, moulded or extruded articles in which softness or flexibility is an important quality, for the manufacture of paints, adhesives for shoe industry and so on.

Example 1

In a vessel, I placed 200 parts of 60 per cent creamed or centrifugalized latex stabilized by means of ammonia (5 g. of NH3 per litre).

1. I added to the latex 4 parts of a protective colloid such as casein dissolved in hot condition in a little ammonia to prevent any latex coagulation in the following steps.

2. I then added, on cold, 20 parts of hydrogen peroxide, preferably one which is capable of evolving 110 volumes of oxygen; the froth was allowed to settle, then I heated to about 60° C. for 3 hours.

3. I allowed to cool, and again proceeded as set forth at 2.

4. I allowed to cool, and again proceeded as set forth at 2 but with 40 parts of concentrated hydrogen peroxide instead of 20 parts.

5. I allowed to cool, and proceeded as set forth at 4.

6. I added 10 ccm. of ammonia (22° Bé.).

A good adhesion power corresponds to a determined plastification of rubber globules partly depolymerized by hydrogen peroxide. If hydrogen peroxide is caused to act for too short a time, an insufficient adhesive power is obtained; if action is protracted for too long a time resistance to tear which is necessary for a high grade glue is lessened.

Latex is not resinified by very concentrated hydrogen peroxide since an acetone extract from dry glue is substantially the same as one obtained from initial latex. It is rather found that rubber globules are partly depolymerized, i. e. the molecular size of rubber still in aqueous suspension is smaller, hydrogen peroxide playing the part both of a catalyst and an oxidizing agent.

Thus my method also provides means for plastifying rubber contained in latex, thereby largely sparing power in making mixes; as a matter of fact, dry gum produced from coagulation retains, like gum plastified on a mixer, its capability of vulcanization, an operation in which the molecule bits obtained from depolymerization are grouped again into nets. This method may thus be carried out in plantations, where latex is produced.

The ratio between the viscosity of dry gum and its adhesive power allows of rationally controlling industrial production of the glue, in contradistinction with latex glues prepared in accordance with known methods. By means of the Höppler ball viscosimeter, it is easy to measure the amount of plasticity of rubber globules, e. g. by operating as follows:

1 part of dry gum obtained from the glue by evaporation is dissolved in 100 parts of crystallisable benzene by strongly stirring in a closed vessel, and the time taken by the ball to fall to the bottom of the solution thus obtained is measured at a temperature of 20° C.

A glue giving good results in industrial practice yields upon evaporation a much less viscid gum than that obtained from the same latex which has not been treated (the time taken by the ball to fall to the bottom is about four times longer with gum from non-treated latex than with gum from the glue).

The glue manufactured in accordance with my method yields a very adhesive dry film which is not fit for vulcanization. Heat alone would unstick surfaces bonded by said glue.

It has been contemplated to react hydrogen peroxide with latex already admixed with accelerators, but the process causes latex coagulation and gives bad results.

According to this invention, for converting the above non-vulcanizable adhesive glue, into a glue yielding a film capable of self-vulcanizing on cold, I add to said adhesive glue the usual ingredients for latex vulcanization as an aqueous suspension thereof carefully prepared in a ball mill.

Example 2

To 200 parts of adhesive glue prepared as above described, I added the following mixture, carefully ground in a ball mill for 40 hours:

| | Parts |
|---|---|
| Sulphur | 4 |
| Zinc ethylphenyl dithiocarbamate | 2 |
| Zinc oxide | 6 |
| Dispersing agent as a 20 per cent solution | 4 |
| Distilled water | 84 |
| | 100 |

The foregoing proportions may be varied at will to obtain the required vulcanization speed; stabilizing agents, anti-oxygens and filling materials as commonly used with latex may also be added.

A glue treated as above leaves upon evaporation a dry film which is self-vulcanizing on cold but a little less adhesive. In order to obtain a fully satisfactory sticking, nonvulcanizable glue and glue treated as above should be employed together.

Good results were obtained by operating as follows:

Both surfaces to be stuck together were strongly scraped and carefully brushed; they were then coated by means of a brush or a spray-gun with a layer of nonvulcanizable glue then a layer of vulcanizable glue and so on so that two different layers alternate. The number of layers might vary from 3 to 10, according to the surfaces to be coated.

Each layer was dried in a warm air oven heated to 40° C.

It is advantageous strongly to hammer the surfaces thus united together so as to improve adhesion, and to wait about a week before exerting any drawing force, so as to leave sufficient time for vulcanization at room temperature of the dry film bonding said surfaces. Self-vulcanization of both films takes place after drying because sulphur and accelerators contained in the vulcanizable film migrate into the non-vulcanizable film by reason of the contact. Curing may be effected more rapidly in hot condition, preferably in a press with heated plates.

A glue manufactured in accordance with this invention may be used to bind in a very efficient manner quite various surfaces, particularly leather with leather, fabric with leather and rubber, felt with leather and rubber, rubber with rubber and so on.

Generally speaking, my method of chemically plastifying rubber is deemed to offer the following advantages:

1. While mastication of dry rubber sheets on cold or hot cylinders, even controlled by means of a plastometer, results only in an approximate plasticity, the present method secures a regularity and accuracy unknown up to this time.

2. The use of pre-plastified gums represents for rubber manufacturers a considerable saving of electric energy, manpower and machine upkeep expenses. The output of mixes from a roll mill relieved from mechanical mastication of rubber will be much higher since chemically plastified rubber will be adapted readily to receive mixing ingredients.

As the power consumption will be much less than before a considerably lighter thus less expensive machinery may be adopted for the same output capacity.

The chemical plastification of rubber in accordance with this invention amounts to the same depolymerization as mechanically produced with a roll mixer. The plastified gum can be vulcanized according to standard practice, and the natural or accelerated ageing of the vulcanization product is very good. The employment of anti-oxidants as used in the present time is particularly advisable with gum treated according to my method.

The acetonic extract of a gum having a plasticity of 1800° Barbey is equivalent to one produced from the same gum untreated. Therefore no abnormal resinification of rubber has taken place, and it is likely that oxygen has produced but a catalytic action.

Chemically plastified latex may be shipped like untreated latex.

As the modules of elasticity after vulcanization is less, more flexible articles may be obtained without adding any plasticizer, than commonly produced from the same, untreated latex. Latex treated according to this invention may be employed as such or in combination according to any proportion with untreated latex for the manufacture of dipped, moulded or extruded goods wherein flexibility is specially required, for the manufacture of paints and so on.

It should be understood that the foregoing examples have no limitative character, and have been set forth merely to show how this invention may be carried out.

For instance the reaction may be caused to proceed beyond 3 hours, this being an approximate minimum of time; the reaction duration may be raised to 24 or even 48 hours, the only drawback being to lengthen manufacture; beyond 3 hours, time factor is substantially immaterial for the polymerization degree. I wish also to point out that cooling after the reaction with hydrogen peroxide has been completed is beneficial because it avoids too large a production of foam and losses of oxygen and latex, so that even where the reaction takes place at ambient temperature of about 30° C. in plantation, it is advisable to cool, say to 10 or 15° C. Again, the treatment may be performed in a closed vessel.

What I claim is:

1. A process of preparing rubber products from unpeptized rubber latex that comprises treating the latex with an amount of aqueous hydrogen peroxide containing about one part of $H_2O_2$ to two parts of water by weight, such that the ratio between the hydrogen peroxide, on the basis of its $H_2O_2$ content and the amount of latex, on the basis of its dry gum content, is about one part of $H_2O_2$ to three parts of dry gum.

2. A process of preparing rubber products from unpeptized rubber latex that comprises treating the latex at a temperature from about 20° C. to about 60° C., with an amount of aqueous hydrogen peroxide containing about one part of $H_2O_2$ to two parts of water by weight, such that the ratio between the hydrogen peroxide, on the basis of its $H_2O_2$ content and the amount of latex, on the basis of its dry gum content, is about one part of $H_2O_2$ to three parts of dry gum.

3. A process of preparing rubber products from unpeptized rubber latex that comprises treating the latex in several steps at a temperature of between about 20° C. and about 60° C. with an amount of aqueous hydrogen peroxide containing about one part of $H_2O_2$ to two parts of water by weight such that the ratio between the hydrogen peroxide on the basis of its $H_2O_2$ content and the amount of latex on the basis of its dry gum content, is about one part of $H_2O_2$ to three parts of dry gum, and cooling the latex between successive treating steps.

4. A process of preparing rubber products from unpeptized rubber latex that comprises treating the latex in four steps with an amount of aqueous hydrogen peroxide containing about one part of $H_2O_2$ to two parts of water by weight, such that the ratio between the hydrogen peroxide, on the basis of its $H_2O_2$ content and the amount of latex, on the basis of its dry gum content, is about one part of $H_2O_2$ to three parts of dry gum, and cooling the treated latex between successive treating steps.

CHARLES SAINT-MLEUX.

REFERENCES CITED

The following references are of record in the file of this patent:

UNITED STATES PATENTS

| Number | Name | Date |
|---|---|---|
| 2,005,320 | Konrad et al. | June 18, 1935 |
| 2,177,856 | Bennett | Oct. 31, 1939 |
| 2,206,448 | Busse et al. | July 2, 1940 |
| 2,370,044 | Keene et al. | Feb. 20, 1945 |